UNITED STATES PATENT OFFICE.

BENJAMIN F. LEE, OF NEW YORK, N. Y., ASSIGNOR TO NEW YORK RUBBER COMPANY.

IMPROVEMENT IN INDIA-RUBBER BELTING.

Specification forming part of Letters Patent No. 26,549, dated December 20, 1859.

*To all whom it may concern:*

Be it known that I, BENJAMIN F. LEE, of New York city, in the county and State of New York, have invented a new and useful Improvement on Belting or Banding for Driving Machinery and other purposes; and I do hereby declare the following to be a full and clear description thereof.

Numerous attempts have been made to supersede the ordinary leather belt or band such as is commonly used for communicating motion from one pulley to another in various kinds of machinery. The principal object designed to be attained by the employment as a substitute of other description of belting has been to economize the cost of leather as a material for the purpose. While many of such substitutes, however, show a considerable reduction of first cost, they have failed to be durable and strong, or else have been wanting in other no less important respects connected with the working of the belt. Some of these substitutes, it is said, excel an ordinary solid and tough leather belt in certain properties or peculiarities; but, inasmuch as they have been wanting in other respects of a more important character, they fail to become generally adopted. It is in large and thick belting—such as is used for driving heavy machinery—that the attempts to supersede leather have heretofore most signally failed. In india-rubber or gutta-percha belting, for instance, owing to the difficulty and expense or impossibility of weaving a fabric of the necessary stoutness to form thick or "heavy" belt, it has been usual to make up the belt of a series of layers of sail-duck or other stout fabric cemented together by an india-rubber composition, or whatever the cementing substance may be, and afterward coating or not, as may be, with said composition, or with any other suitable substance, the outside of the belt or band formed by the layers of cloth cemented together, as described.

It is unnecessary here to enter into the minutia of the manufacture connected with the production of what may be termed "artificial" belts or bands, as distinguishable from the solid or pure leather belts; but it will suffice to say that in all productions of the kind heretofore made there have been defects which no foreskill could remedy or prevent. Thus, in the case of india-rubber bands of the character herein previously described, the cementing of the two or more layers of the cloth together is necessarily effected with the layers in a flat position or otherwise in a different position to that which they occupy when the band is in its place on the pulleys it serves to operate; also, it is customary in the manufacture of said bands, after they have received their coating, to pass them between rolls for the purpose of flattening and solidifying them. A belt or band so produced is not suited to bear the exposure of heavy strain in other than a flat or straight direction. Hence it loosens, splits, or opens at the joining of its layers by reason of the varied strain to which it is subjected, but more especially by reason of the curvilinear action or strain on it in its passage round or over the pulleys it is employed to connect or operate. This will be self-evident when it be considered that the outer layer of the band, when passing round the pulleys, is heavily stretched or expanded, as it were, while the inner layer of the band, moving in a circle or lesser radius, is compressed. Such unequal curvature and strain of the several layers making up the band necessarily causes rupture and disconnection of the layers. In india-rubber bands, too, where the same are vulcanized after the several layers have been joined together, the heat necessary to effect vulcanization produces air-cells in the band, which air-cells are expanded and form starting-points for and facilitate the rending of the band.

The present improvement obviates these and other difficulties and effects the production of an entire new description of belt or band, which, though of a combination character, has its layers so united or tied together as virtually to make of it a single layer or solid belt. Such combination belt, forming as it does a new article of manufacture never before known in any market, may be made of any desired thickness, breadth, and length and be put up in rolls for sale or use, as is the ordinary leather belt.

The process of manufacture of such a belt may be as follows: Take any number of layers, according to the thickness of belt required, of sail-duck or other woven fabric or suitable fibrous material of proper length and width, and "build up" the belt or band by interposing or applying a caoutchouc or other cement and arranging the layers with the cement in between and within their interstices, the one upon the other, and otherwise similarly, it may be, treat the united layers as in the manufacture of ordinary india-rubber belting or in any other proper manner to make of them one firm thick belt or band. Other than india-rubber or gutta-percha cement may be used; but where these are employed the band may or may not be vulcanized, as required. The outside surface or surfaces of said band may either be coated with the cement used to unite the layers or other suitable compositions or it may be otherwise covered or be left bare. Prior, however, to putting on such outside coating, (if any be used,) or subsequently to putting it on, as may be preferred, the several layers of fibrous material thus held together by the cement are to be "quilted" or stitched throughout the whole mass at different points, and which may be done by sewing with suitable thread, string, or wire either in straight lines or seams in direction of the length of the belt, or in undulating directions along the belt, or diagonally along or across the belt, or straight across it, or in any other suitable direction or directions. Thus sewed together at frequent points or in frequent lines over and through the whole body of the belt, a combination belt or band is produced of the most perfect character, and one that is durable and strong. In it the inner layers are so bound to the outer layers and the whole is so welded together as to actually prevent the layers coming apart by the difference of strain on the outer and inner layers in the working of the belt round its pulleys, and the strain is more equally distributed throughout the several layers. If the stitches in the quilting of the band are properly arranged, it will be less liable to rend across if a cut be started at either edge than is a leather band, and it may be made in several respects superior to a leather band and cheaper than it. The cement interposed between the several layers of the fibrous material lessens the strain upon the stitches, and the stitches lessen the strain upon the cement in the working of the band, and the cement checks or prevents separation of the layers in case of some of the stitches working or wearing loose or breaking.

Where it is desired to protect the stitches against outside rub or wear or to conceal them from view, the quilting should be done before applying the composition to the outside surfaces or otherwise coating the band on one or both of its sides.

The sewing of the several layers together at or in frequent lines or points, and which has here been termed "quilting," must be effected by machinery; and in this connection it is only necessary to observe that any suitable sewing-machine or character of stitch in which two threads are used meeting in the center of the mass may be preferred, on account of the location of the lock and character of said stitch; but the Grover & Baker, or even a single-thread chain-stitch, or any other form of stitch may be adopted. Much, as regards the selection of the stitch, also as regards the directions in which the stitches are to run, may depend upon the elasticity required of the band in direction of its length. It is not absolutely necessary that all the layers making up the combination band (if more than two be used) should be stitched together in the manner described, but at least that two of the layers should. Where the band is made up of many layers cemented together the several layers may be stitched together in pairs or triplets, or more, before uniting the whole body of layers together.

Having thus described my improvement, and the manner in which the same is or may be carried into effect, I claim—

As a new and useful article of manufacture, the combination belting or banding herein specified, and consisting of two or more thicknesses or layers of fibrous material cemented and quilted together, substantially as herein set forth.

In testimony whereof I have signed my name to this specification before two subscribing witnesses.

BENJ. F. LEE.

Witnesses:
 JOHN MACKENZIE,
 JOHN MACON, Jr.